United States Patent
Inoue et al.

(10) Patent No.: US 9,037,313 B2
(45) Date of Patent: May 19, 2015

(54) LID LOCK CONTROLLER

(71) Applicant: Kabushiki Kaisha Tokai Rika Denki Seisakusho, Aichi (JP)

(72) Inventors: Tomohiro Inoue, Aichi (JP); Keigo Nishimoto, Aichi (JP)

(73) Assignee: Kabushiki Kaisha Tokai Rika Denki Seisakusho, Aichi (JP)

(*) Notice: Subject to any disclaimer, the term of this patent is extended or adjusted under 35 U.S.C. 154(b) by 0 days.

(21) Appl. No.: 13/707,896

(22) Filed: Dec. 7, 2012

(65) Prior Publication Data

US 2013/0158744 A1     Jun. 20, 2013

(30) Foreign Application Priority Data

Dec. 14, 2011 (JP) ................................ 2011-273719

(51) Int. Cl.
*B60K 15/05* (2006.01)
*G07C 9/00* (2006.01)

(52) U.S. Cl.
CPC ............ *B60K 15/05* (2013.01); *G07C 9/00309* (2013.01); *G07C 2009/00793* (2013.01); *G07C 2209/63* (2013.01)

(58) Field of Classification Search
CPC ............ B60K 2015/0561; E05B 83/34; E05B 63/0056; Y10S 220/33; G07C 5/008; G07C 9/00309; G07C 2009/00793; B60R 25/24; F02N 11/0807
USPC ................... 701/2; 340/457, 5.61, 5.65, 5.72; 343/713; 70/84, 241, 257
See application file for complete search history.

(56) References Cited

U.S. PATENT DOCUMENTS

| | | | |
|---|---|---|---|
| 6,366,040 B1* | 4/2002 | McLennan et al. | 318/280 |
| 7,663,502 B2* | 2/2010 | Breed | 340/12.25 |
| 8,330,571 B2* | 12/2012 | Yamaguchi et al. | 340/5.61 |
| 2009/0056830 A1* | 3/2009 | Beier et al. | 141/350 |
| 2010/0194529 A1* | 8/2010 | Yamamoto | 340/5.65 |
| 2012/0098278 A1* | 4/2012 | Proefke et al. | 292/144 |

(Continued)

FOREIGN PATENT DOCUMENTS

| | | |
|---|---|---|
| CN | 101045475 | 10/2007 |
| CN | 201278162 | 7/2009 |

(Continued)

OTHER PUBLICATIONS

JP2007153155_machine english translation, Kodobashi.*

(Continued)

*Primary Examiner* — Helal A Algahaim
*Assistant Examiner* — Jelani Smith
(74) *Attorney, Agent, or Firm* — Greenblum & Bernstein, P.L.C.

(57) ABSTRACT

A lid lock controller includes a lid lock unit operable in a lock state, which keeps the lid closed, and an unlock state, which allows for the lid to open. A detection unit detects an unlocking operation performed on the lid lock unit. A key check unit checks whether or not an electronic key is located in the vicinity of the vehicle through wireless communication between the vehicle and the electronic key when the unlock operation is detected. An unlocking unit switches the lid lock unit to the unlock state when the electronic key is located in the vicinity of the vehicle. The unlocking unit switches the lid lock unit to the unlock state even when the electronic key is not located in the vicinity of the vehicle as long as a further lid unlock condition is satisfied.

10 Claims, 8 Drawing Sheets

(56) References Cited

U.S. PATENT DOCUMENTS

| | | |
|---|---|---|
| 2012/0313768 A1 | 12/2012 | Campbell et al. |
| 2013/0109342 A1* | 5/2013 | Welch ........................ 455/404.2 |
| 2013/0151064 A1* | 6/2013 | Becker et al. ................ 701/31.4 |

FOREIGN PATENT DOCUMENTS

| | | | | |
|---|---|---|---|---|
| CN | 101519038 | | | 9/2009 |
| CN | 201506328 | | | 6/2010 |
| CN | 101983391 | | | 3/2011 |
| JP | 2002-106223 | | | 4/2002 |
| JP | 2005-133529 | | | 5/2005 |
| JP | 2005-280586 | | | 10/2005 |
| JP | 2005280586 | A | * | 10/2005 |
| JP | 2007153155 | A | * | 6/2007 |
| JP | 2008-120193 | | | 5/2008 |
| JP | 2010-127030 | | | 6/2010 |

OTHER PUBLICATIONS

JP2005280586_machine english translation, Michishige.*
China Office action, mail date is Dec. 14, 2014.
Japanese Office Action for JP 2011-273719, mail date is Apr. 7, 2015.

* cited by examiner

Reference Close Position

Over stroke position

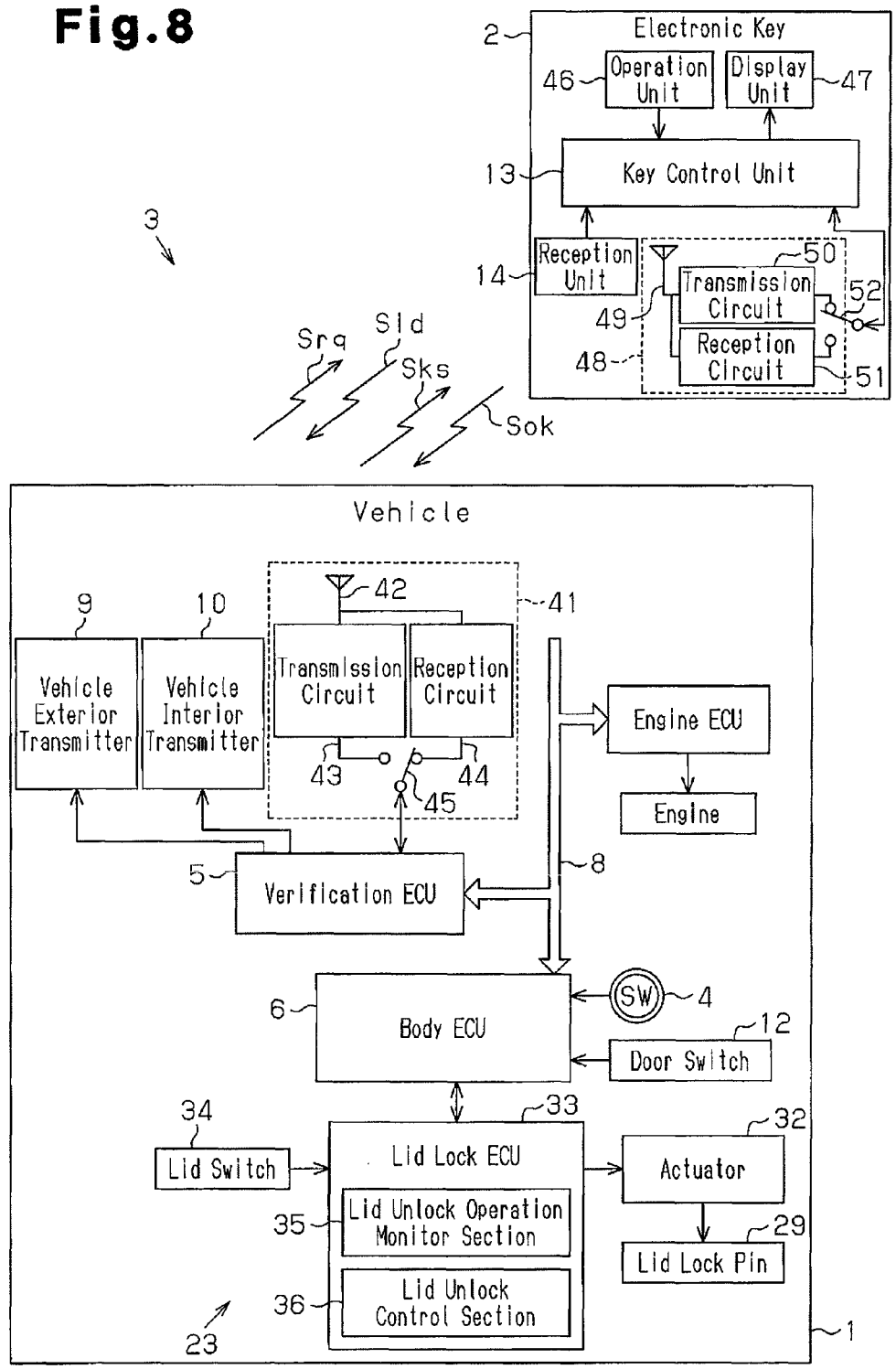

LID LOCK CONTROLLER

CROSS-REFERENCE TO RELATED APPLICATIONS

This application is based upon and claims the benefit of priority from prior Japanese Patent Application No. 2011-273719, filed on Dec. 14, 2011, the entire contents of which are incorporated herein by reference.

BACKGROUND

The present invention relates to a lid lock controller that controls the locking and unlocking of a lid of a vehicle.

The body of a vehicle (e.g., gasoline vehicle) includes a fuel lid that opens and closes a fuel filler. The lid includes a lid lock device that prevents unauthorized opening of the lid. A typical lid lock device includes a lid lock pin that may be engaged with the lid. The lid lock pin is engaged with the lid to lock the lid and disengaged from the lid to unlock the lid.

Japanese Laid-Open Patent Publication No. 2005-280586 describes a lid lock device that performs an unlock control when a lid switch (or lid lock lever) is operated under a situation in which the vehicle door is unlocked and ID verification of an electronic key is accomplished.

Japanese Laid-Open Patent Publication No. 2005-133529 describes another lid lock device that unlocks the lid when a feet detection sensor, which is arranged at a lower portion of the vehicle body, determines that the user is in the vicinity of the lid and, at the same time, ID verification of an electronic key is accomplished.

In the lid lock device of Japanese Laid-Open Patent Publication No. 2005-280586, when the vehicle door is locked, the lid cannot be unlocked even if the lid switch is operated in a state in which the ID verification of the electronic key is accomplished. In this case, the user is required to unlock the vehicle. This is inconvenient.

In the lid lock device of Japanese Laid-Open Patent Publication No. 2005-133529, the user has to move to the detection area of the feet detection sensor to unlock the lid. This may be inconvenient because the user has to be in the vicinity of the vehicle for the feet detection sensor to function. Further, when the user is in the vicinity of the vehicle, the lid may be unlocked against the user's will.

SUMMARY

Accordingly, there is a need to develop a lid lock device that operates as intended by the user.

One aspect of the present invention is a lid lock controller that controls locking and unlocking of a lid of a vehicle. The lid lock controller includes a lid lock unit operable in a lock state, which keeps the lid closed, and an unlock state, which allows for the lid to open. A detection unit detects an unlocking operation performed on the lid lock unit. A key check unit checks whether or not an electronic key is located in the vicinity of the vehicle through wireless communication between the vehicle and the electronic key when the unlock operation is detected. An unlocking unit switches the lid lock unit to the unlock state when the electronic key is located in the vicinity of the vehicle. The unlocking unit switches the lid lock unit to the unlock state even when the electronic key is not located in the vicinity of the vehicle as long as satisfaction of a further lid unlock condition may be recognized.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 8 is a block diagram schematically illustrating the electric configuration of a communication system including a second embodiment of a lid lock device;

DESCRIPTION OF THE EMBODIMENTS

A first embodiment of a lid lock controller will now be described with reference to FIGS. 1 to 7.

Figure 1:
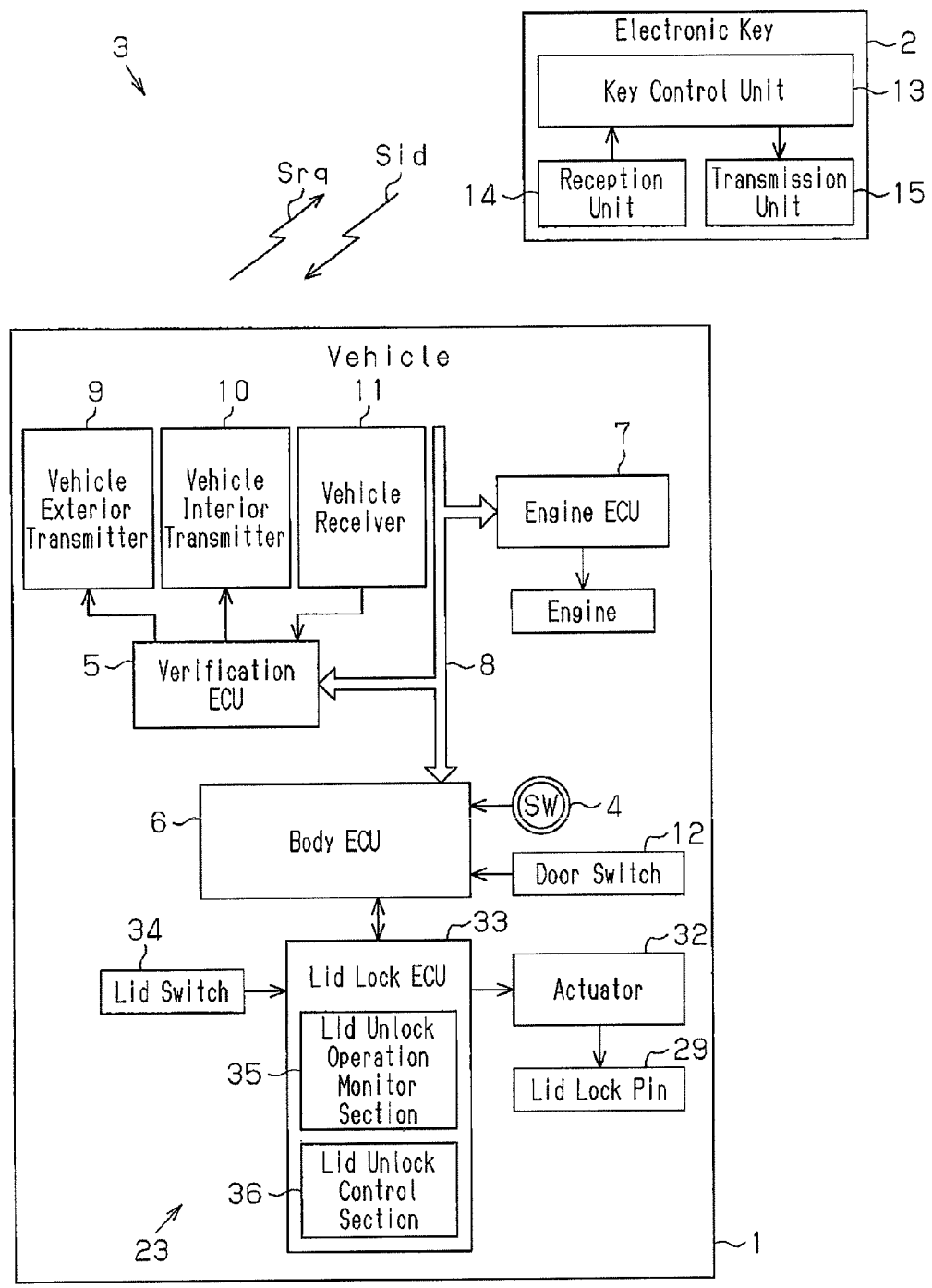
FIG. 1 is a block diagram schematically illustrating the electric configuration of a communication system including a first embodiment of a lid lock device.

As illustrated in FIG. 1, a vehicle 1 includes a key-operation-free system 3 serving as a communication system that performs communication between the vehicle 1 and an electronic key 2. In the key-operation-free system 3, when near field communication (communication distance, few meters) is established, ID verification (smart verification) is performed by the vehicle 1 and the electronic key 2. When the electronic key 2 is located outside the vehicle 1 and ID verification (vehicle exterior smart verification) is accomplished, the key-operation-free system 3 performs a series of door open/close processes to automatically lock and unlock a vehicle door. When the electronic key 2 is located inside the vehicle 1 and ID verification (vehicle interior smart verification) is accomplished, vehicle power switching and engine starting operations with an engine switch 4 are permitted.

The key-operation-free system 3 includes a verification electronic control unit (ECU) 5, which performs ID verification on the electronic key 2, a body ECU 6, which manages the power for in-vehicle electric devices, and an engine ECU 7, which controls the operation of the engine. The verification, body, and engine ECUs 5 to 7 are connected to one another by an in-vehicle bus 8. The verification ECU 5 is connected to a vehicle exterior transmitter 9, which transmits radio waves on a low frequency (LF) band to the exterior of the vehicle 1, a vehicle interior transmitter 10, which transmits LF radio waves to the interior of the vehicle 1, and a vehicle receiver 11, which receives radio waves on the ultra-high frequency (UHF) band. A door switch 12, which detects the locking and unlocking of a vehicle door, is connected to the body ECU 6. The door switch 12 is one example of a vehicle door lock-unlock detection unit.

The electronic key 2 includes a key control unit 13, which controls the operation of the electronic key 2. An ID code, which is unique to the electronic key 2, is registered to the key control unit 13. The key control unit 13 is connected to a reception unit 14, which receives LF radio waves, and a transmission unit 15, which transmits UHF radio waves.

When the electronic key 2 is located outside the vehicle 1, the verification ECU 5 intermittently transmits a request signal Srq from the vehicle exterior transmitter 9 to establish vehicle exterior smart communication. When the electronic key 2 enters a vehicle exterior communication area, the electronic key 2 receives the request signal Srq. This activates the electronic key 2, which transmits an ID signal Sid used for smart verification. The ID signal Sid includes the ID code registered to the electronic key 2. When the verification ECU 5 receives the ID signal Sid from the electronic key 2 with the vehicle receiver 11, the verification ECU performs vehicle exterior smart verification. When the vehicle exterior smart communication is accomplished, the body ECU 6 permits or performs the locking or unlocking of the vehicle door.

When the electronic key 2 enters the vehicle 1, the vehicle interior transmitter 10, which succeeds the vehicle exterior transmitter 9, starts to transmit the request signal Srq and performs vehicle interior smart communication, which is performed in the same manner as the vehicle exterior smart verification. When vehicle interior smart verification is accomplished, the vehicle power switching and engine starting operations with the engine switch 4 are permitted.

Figure 2:
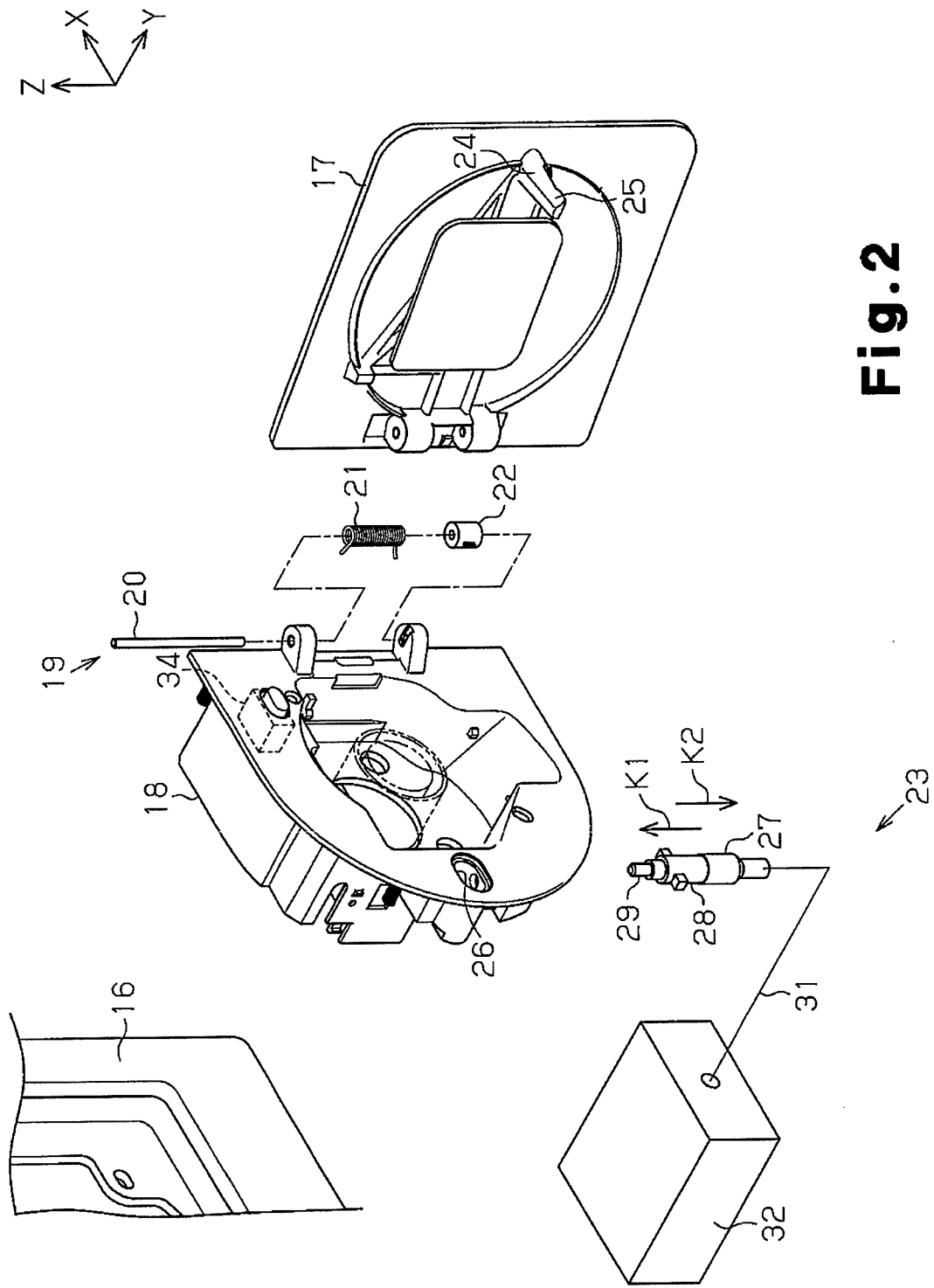
FIG. 2 is an exploded perspective view schematically illustrating the lid lock device of FIG. 1.

As illustrated in FIG. 2, a vehicle body 16 has a side wall including a lid 17, which is hinged at the side. The lid 17 opens and closes a fuel filler (gasoline vehicle or plug-in hybrid vehicle) or a power inlet (plug-in hybrid vehicle or electric vehicle). In this example, a coupling panel 18 is arranged in the side wall of the vehicle body 16, and the lid 17 is coupled by a hinge 19 to the coupling panel 18. The hinge 19 includes a shaft 20. An open direction urging member 21, which urges the lid 17 in an open direction, is coupled to the shaft 20. The urging member 21 is, for example, a torsion spring. Further, a damper 22 is arranged on the shaft 20 so that the lid 17 does not move in a sudden manner when opening.

Figure 3:
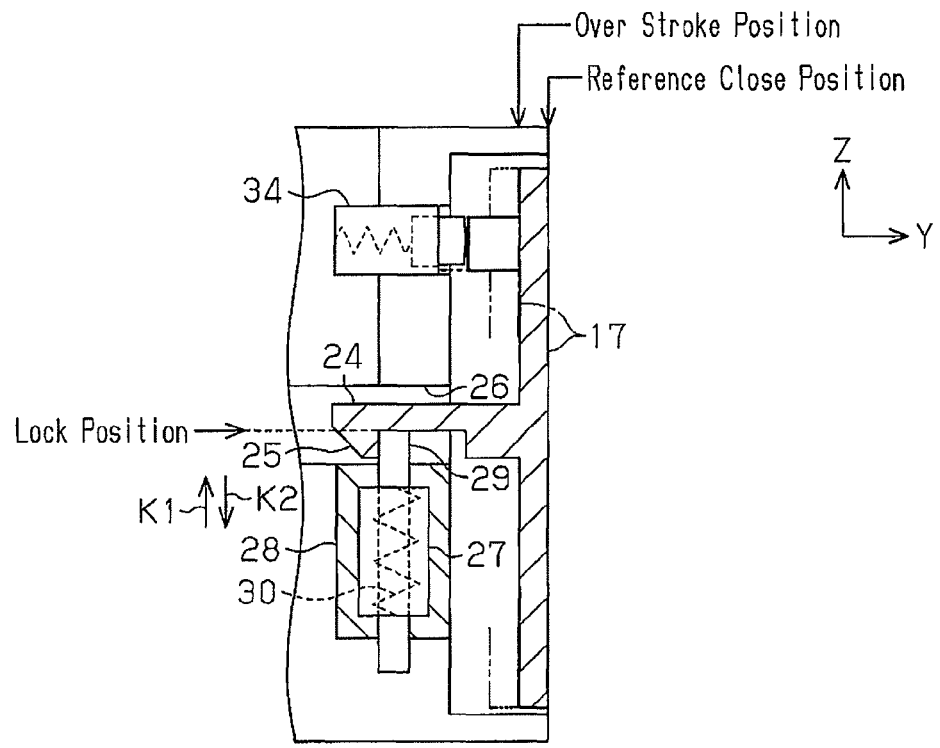
FIG. 3 is a cross-sectional view illustrating a lid lock unit in a lock state.
Figure 4:
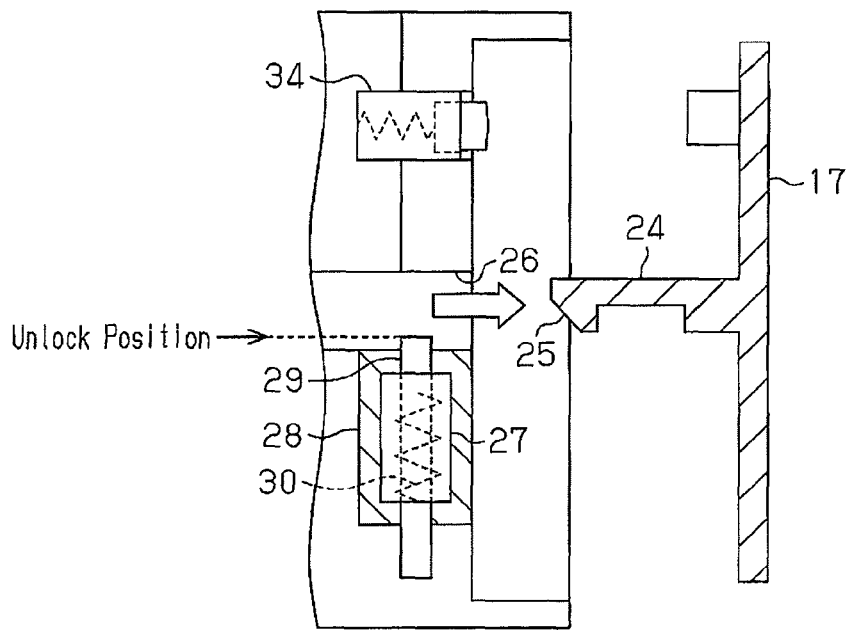
FIG. 4 is a cross-sectional view illustrating the lid lock unit in an unlock state.

Referring to FIGS. 2 to 4, a lid lock device 23, which locks the lid 17 in a closed state, is arranged on the lid 17. In this example, a projection 24 projects from a rear surface of the lid 17. The projection 24 includes a hook 25 formed on a distal end. The coupling panel 18 includes a projection receptacle 26 that receives the projection 24 when the lid 17 is closed.

The lid lock device 23 includes a lid lock unit 27 that may be shifted between a lock state, in which the lid 17 is kept closed, and an unlock state, in which the lid 17 is allowed to open. The lid lock unit 27 is arranged in the coupling panel 18 and keeps the lid 17 closed in cooperation with the hook 25 of the projection 24. The lid lock unit 27 includes a tubular case 28 and a rod-shaped lid lock pin 29, which is accommodated in the case 28. The lid lock pin 29 is linearly movable back and forth in a direction intersecting the opening and closing direction of the lid 17. Further, the lid lock pin 29 is held in the case 28 so that it cannot be separated from the case 28. An urging member 30 is coupled to the lid lock pin 29 to urge the lid lock pin 29 in a projecting direction. The urging force of the urging member 30 pushes and moves the lid lock pin 29 in the projecting direction, i.e., lock direction (direction of arrow K1 in FIG. 3), to a lock position (state illustrated in FIG. 3). Further, the lid lock pin 29 is linearly moved against the urging force of the urging member 30 in an unlock direction (direction of arrow K2 in FIG. 3) to release the lid 17 from the closed state. The urging member 30 is, for example, a coil spring.

As illustrated in FIG. 2, the lid lock pin 29 is connected by a cable 31 to an actuator 32. An attraction solenoid, for example, is used as the actuator 32. When the actuator 32 is deactivated, the lid lock pin 29 is located at a lock position (state illustrated in FIG. 3) by the urging force of the urging member 30. When the actuator 32 is activated, the actuator 32 draws the lid lock pin 29 with the cable 31 to an unlock position (state illustrated in FIG. 4). When the actuator 32 is deactivated, the lid lock pin 29 may be moved back and forth between the lock position and the unlock position.

The lid lock device 23 includes a lid lock ECU 33, which controls the lid lock unit 27, and a lid switch 34, which detects an operation for switching the lid 17 from the closed state to the open state, that is, an unlock operation performed on the lid lock unit 27. Referring to FIG. 3, the lid switch 34 detects whether the lid 17 is pushed from a reference close position to an over stroke position. The lid switch 34 is, for example, a push switch. When the lid 17 is pushed to the over stroke position, the lid switch 34 outputs a switch signal. In response to the switch signal from the lid switch 34, the lid lock ECU 33 drives the actuator 32 and switches the lid lock unit 27 to the unlock state. The lid switch 34 is one example of a detection unit.

Referring to FIG. 3, when the actuator 32 is deactivated and the hook 25 of the projection 24 engages with the lid lock pin 29 at the lock position, the opening of the lid 17 is prohibited. In this case, the lid lock unit 27 is in a lock state. Referring to FIG. 4, when the actuator 32 is activated to draw the lid lock pin 29 to the unlock position, the lid lock pin 29 is separated from the hook 25. This switches the lid lock device 23 to the unlock state. In this case, the lid 17 is automatically pivoted in the open direction by the opening direction urging member 21.

The lid lock device 23 of the present example implements a lid unlock function that executes unlock control on the lid lock unit 27 based on a logical OR operation of smart verification accomplishment and unlock determination of the vehicle door. The lid unlock function of the present example unconditionally switches the lid lock unit 27 to the unlock state when a user performs an unlock operation on the lid lock unit 27 and smart verification (e.g., vehicle exterior smart verification) is accomplished. Further, even if smart verification is not accomplished when an unlock operation is performed on the lid lock unit 27, as long as the vehicle door is detected as being in the unlock state (detection signal indicating door unlock state received from the door switch 12), the lid lock unit 27 is switched to the unlock state. In the first embodiment, the unlock detection of the vehicle door corresponds to a state in which a further lid unlock condition is satisfied.

In the first embodiment, as illustrated in FIG. 1, the lid lock ECU 33 includes a lid unlock operation monitor section 35, which monitors a user's unlock operation performed on the lid lock unit 27. The lid unlock operation monitor section 35 monitors the switch signal of the lid switch 34 to check whether an unlock operation (user's demonstration of an intention to unlock the lid 17) has been performed. For example, the lid unlock operation monitor section 35 determines that an unlock operation has been performed when the switch signal indicates that the lid 17 is long-pushed over a specified time (e.g., approximately two seconds) or longer. In this example, the verification ECU 5 and the lid unlock operation monitor section 35 form a key check unit.

Further, the lid lock ECU 33 includes a lid unlock control section 36 that controls the switching of the lid lock unit 27 to the unlock state based on the detection of an unlock operation. When the lid unlock control section 36 determines that an unlock operation has been performed on the lid lock unit 27, that is, the user has demonstrated an intention to unlock the lid 17, the lid unlock control section 36 transmits a smart verification execution request to the verification ECU 5 through the body ECU 6 and the bus 8. In response to the request, the verification ECU 5 performs vehicle exterior smart verification and returns the verification result to the lid unlock control section 36. Then, when the lid unlock control section 36 determines that vehicle exterior smart verification has been accomplished, the lid unlock control section 36 activates the actuator 32 and switches the lid lock unit 27 to the unlock state. The lid unlock control section 36 is one example of an unlocking unit.

When the lid unlock control section 36 determines that vehicle exterior smart verification has not been accomplished, the lid unlock control section 36 checks the lock state of the vehicle door with the body ECU 6. The body ECU 6 recognizes the door lock state from the switch signal output from the door switch 12. Thus, the body ECU 6 notifies the lid unlock control section 36 of the vehicle door lock state (door lock state or door unlock state). When the lid unlock control section 36 determines that the vehicle door is in an unlock state, the lid unlock control section 36 activates the actuator 32 and switches the lid lock unit 27 to an unlock state.

Figure 5:
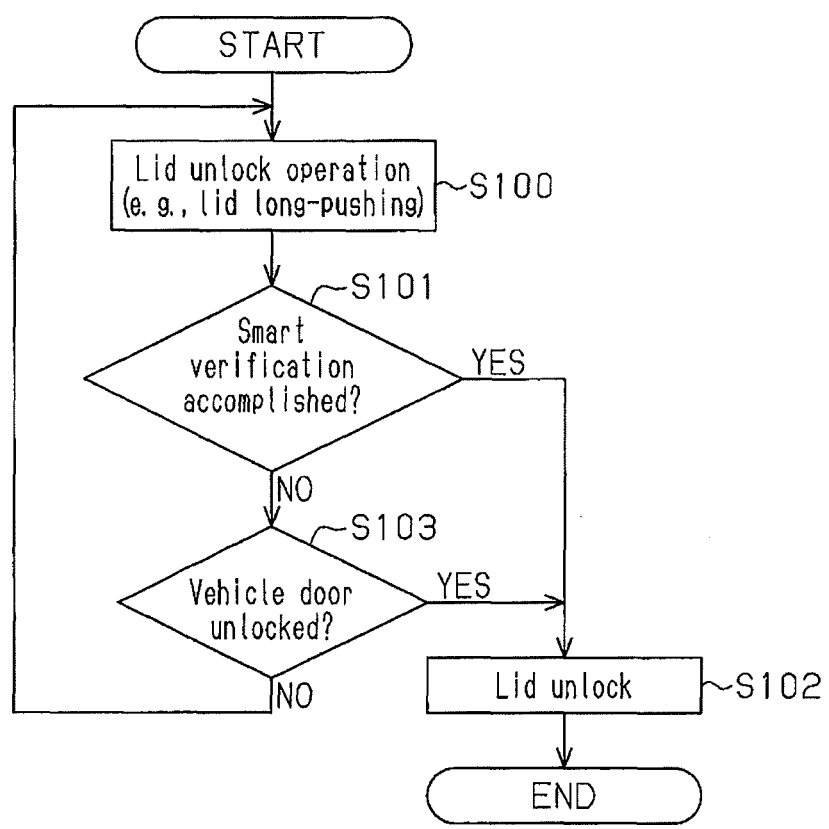
FIG. 5 is a flowchart of a lid unlock process.

The operation of the lid lock device 23 will now be described with reference to FIGS. 5 to 7. The flowchart of FIG. 5 illustrates a process that is performed when the lid 17 is locked.

Figure 6A:
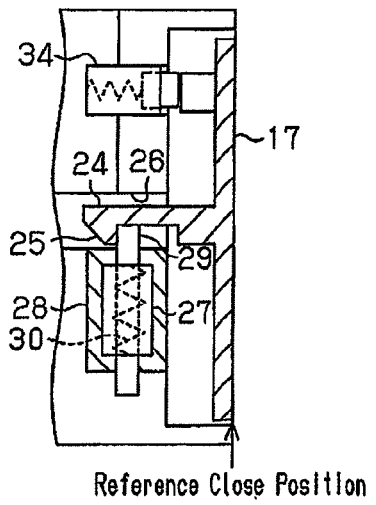
FIGS. 6A to 6D are cross-sectional views illustrating a lid unlock operation.
Figure 6B:
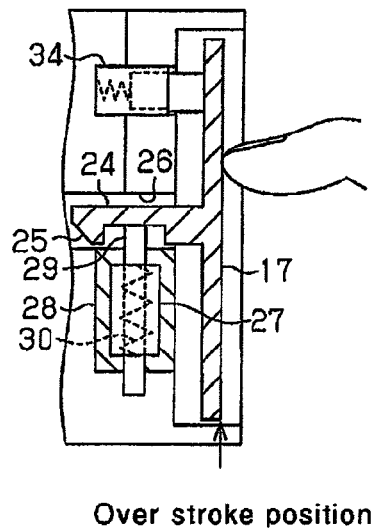
Figure 6C:
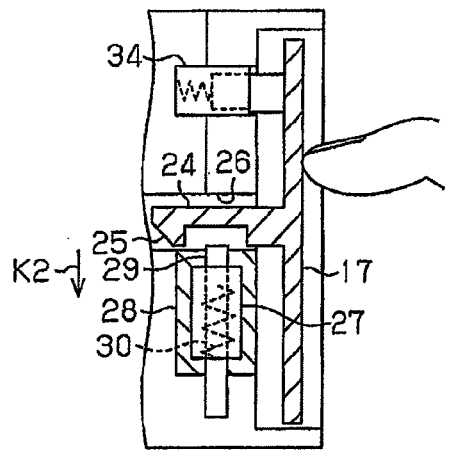

In step S100, the lid unlock operation monitor section 35 of the lid lock ECU 33 monitors the switch signal from the lid switch 34 and checks whether the user has performed an unlock operation on the lid lock unit 27, that is, whether the user has demonstrated an intention to unlock the lid 17. To unlock the lid lock unit 27, the lid 17, which is located at the reference close position illustrated in FIG. 6A, is pushed inward to the over stroke position as illustrated in FIG. 6B and maintained in the pushed state for a predetermined time. When the lid unlock operation monitor section 35 determines that the lid switch 34 has been long-pushed over the specified time or longer, the lid lock ECU 33 proceeds to step S101.

When determined that the user has demonstrated an intention to unlock the lid 17 (unlock operation), in step S101, the lid unlock control section 36 of the lid lock ECU 33 determines whether or not vehicle exterior smart verification has been accomplished. The lid lock ECU 33 proceeds to step S102 when vehicle exterior smart verification has been accomplished and proceeds to step S103 when vehicle exterior smart verification has not been accomplished.

Figure 6D:
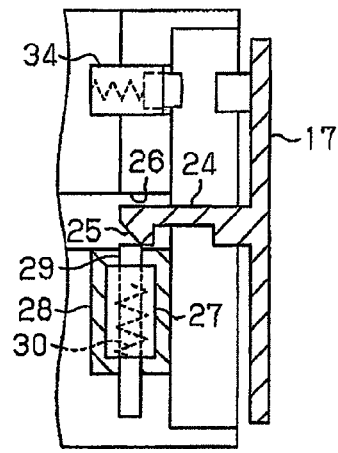

In step S102, the lid unlock control section 36 switches the lid lock unit 27 to the unlock state. More specifically, the lid unlock control section 36 activates the actuator 32 and draws the lid lock pin 29 of the lid lock unit 27 with the cable 31 in the unlock direction (direction of arrow K2 in FIG. 6C). This moves the lid lock pin 29 to the unlock position away from the hook 25 of the projection 24. Thus, as illustrated in the state of FIG. 6D, the urging force of the urging member 21 opens the lid 17.

In step S103, the lid unlock control section 36 determines whether or not the vehicle door is unlocked. When the vehicle door is unlocked, the lid lock ECU 33 proceeds to step S102, and the lid unlock control section 36 switches the lid lock unit 27 to the unlock state. When the vehicle door is locked in step S103, the lid lock ECU 33 returns to step S100 and starts the process from the beginning.

Figure 7A:
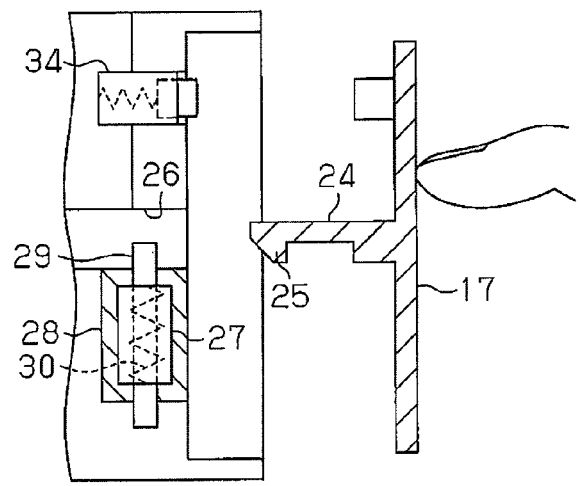
FIGS. 7A to 7C are cross-sectional views illustrating a lid lock operation.
Figure 7B:
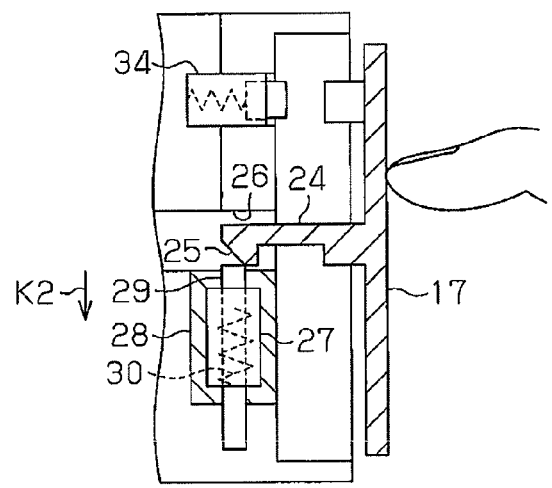
Figure 7C:
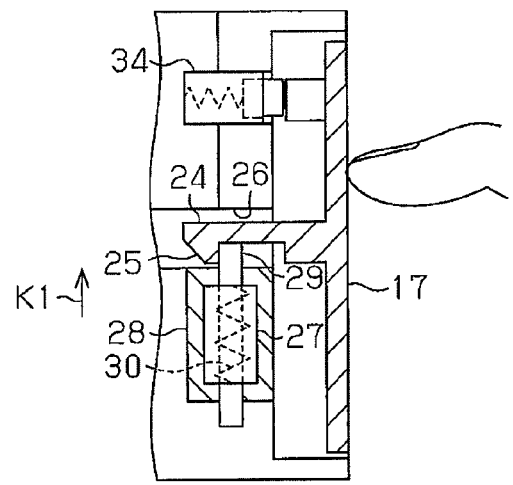

Referring to FIG. 7A, to close the lid 17, the open lid 17 is manually pushed. In this state, the actuator 32 is deactivated. Thus, the lid lock pin 29, which is located at the lock position, is downwardly movable from the lock position (i.e., in the unlock direction). Referring to FIG. 7B, when the projection 24 (hook 25) comes into contact with the lid lock pin 29, the projection 24 lowers the lid lock pin 29 as the lid 17 further moves in the closing direction. In this manner, the closing operation of the lid 17 is permitted. Referring to FIG. 7C, when the lid 17 reaches a fully closed position (reference close position), the urging force of the urging member 30 returns the lid lock pin 29 to the lock position, and the lid lock pin 29 is engaged with the hook 25 of the projection 24. This switches the lid lock unit 27 to the lock state.

When closing the lid 17, the lid 17 may be pushed further inward from the fully closed position (reference close position) to the over stroke position and thereby push the lid switch 34. However, such pushing would be momentary, and the time the lid switch 34 is pushed would be short. Such pushing of the lid switch 34 when closing the lid 17 is taken into consideration when setting the specified time used to detect an unlock operation. Thus, even if the lid switch 34 is pushed when closing the lid 17, the pushing time of the lid switch 34 is shorter than the specified time, and the lid unlock operation monitor section 35 does not detect the pushing of the lid switch 34 as an unlock operation. Accordingly, the lid unlock control section 36 does not recognize an unlock operation and does not activate the actuator 32. As a result, when closing the lid 17, the lid lock unit 27 is switched to the lock state.

As described above, in the first embodiment, when an unlock operation is perform to switch the lid lock unit 27 from the lock state to the unlock state, that is, when the user demonstrates an intention to unlock the lid 17, the lid lock unit 27 is switched to the unlock state as long as the vehicle exterior smart verification is established. Further, when an unlock operation is detected, even if the vehicle exterior smart verification is not established, the lid lock unit 27 is switched to an unlock state as long as the vehicle door is unlocked. Thus, the user can switch the lid lock unit 27 to the unlock state and open the lid 17 without having to carry the electronic key 2. In this state, the lid 17 can be unlocked by switching the lid lock unit 27 to the unlock state as intended by the user. This allows for the elimination of excessive security measures and improves convenience when unlocking the lid 17.

The first embodiment has the advantages described below.

(1) When the lid lock unit 27 is in the lock state, if an unlock operation such as long-pushing of the lid 17 is performed, that is, when the user demonstrates an intention to unlock the lid 17, the lid lock unit 27 is switched to the unlock state as long as the vehicle exterior smart verification is established. Further, even if the vehicle exterior smart verification is not established when an unlock operation is performed, as long as the vehicle door is unlocked, the lid lock unit 27 is switched to the unlock state. This improves convenience when the user performs a lid unlock operation.

(2) For example, when the vehicle 1 is parked in a household garage or the like, the user may perform an opening operation on the lid 17 (e.g., when charging the battery of an electric vehicle from a household power supply) without holding the electronic key 2. Further, after coming home with the vehicle 1, the user may enter his or her house carrying the electronic key 2 without locking the vehicle door, and another vehicle occupant may perform an open operation on the lid 17. In each case, the lid lock unit 27 may be switched to the unlock state. Thus, there is no inconvenience since the lid 17 may be opened even when the electronic key 2 is not located near the vehicle 1.

(3) The lid lock unit 27 includes a lid lock pin 29 that is movable in the lock direction and the unlock direction. The lid lock pin 29 locks the lid 17 when moved by the urging force of the urging member 30 in the lock direction. When activation of the actuator 32 moves the lid lock pin 29 in the unlock direction against the urging force of the urging member 30, the lid 17 is unlocked. In this manner, the lid lock unit 27 has a simple structure and may be switched between a lock state and an unlock state just by moving the lid lock pin 29 with the actuator 32.

(4) The actuator 32 is supplied with power only when unlocking the lid 17. This has a high power-saving effect.

(5) In an electric vehicle, such as a plug-in hybrid vehicle or an electric vehicle, the battery is frequently charged, and the lid of the power inlet is frequently opened. Thus, when applied to such a vehicle, the lid lock controller improves convenience for opening the lid 17. Thus, the application of the lid lock controller is also preferred for an electric vehicle such as a plug-in hybrid vehicle or an electric vehicle.

Figure 9:
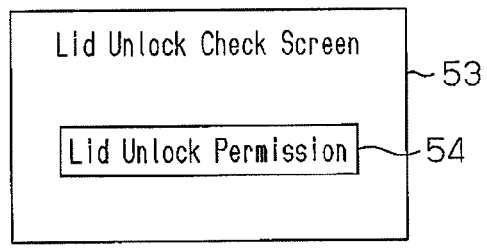
FIG. 9 is a schematic diagram illustrating a lid unlock check screen.
Figure 10:
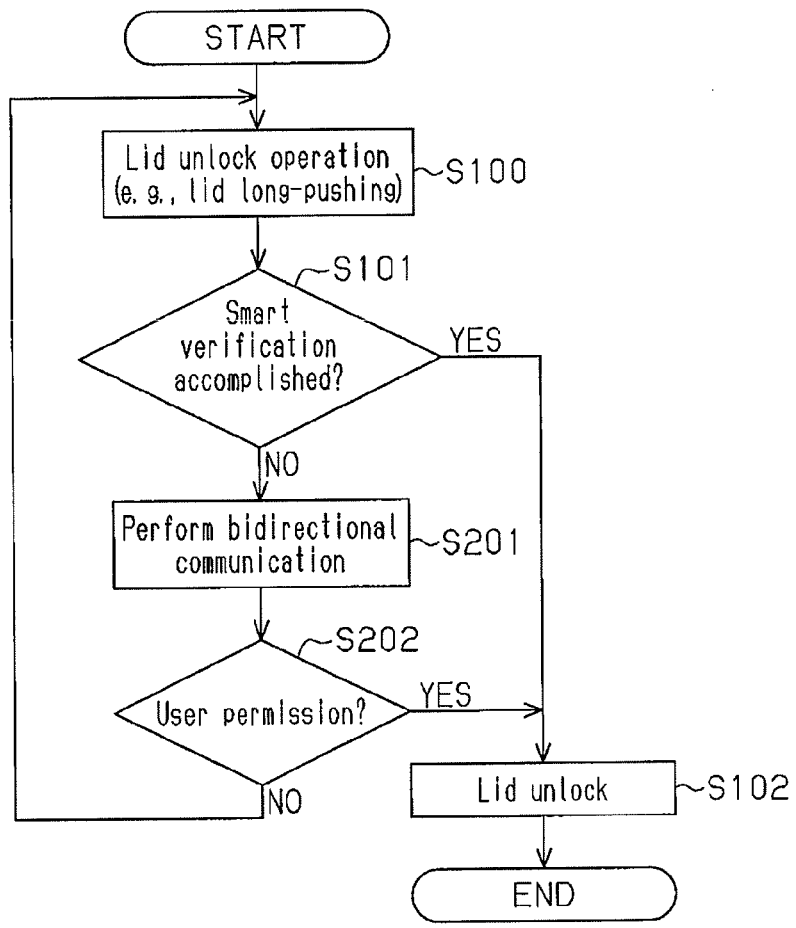
FIG. 10 is a flowchart of a lid unlock process.

A second embodiment will now be described with reference to FIGS. 8 to 10. In the second embodiment, the condition for starting the lid unlock control differs from the first embodiment. Otherwise, the structure is basically the same as the first embodiment. Like or same reference numerals are given to those components that are the same as the corresponding components of the first embodiment. Such components will not be described in detail, and the description will center on the differing parts.

As illustrated in FIG. 8, the verification ECU 5 is connected to a vehicle communication device 41, which transmits and receives UHF radio waves. The vehicle communication device 41 includes a single antenna 42, a transmission circuit 43, and a reception circuit 44. The transmission and reception circuits 43 and 44 both use the antenna 42. The verification ECU 5 controls a switch unit 45 and selectively connects the transmission circuit 43 or the reception circuit 44 to the verification ECU 5. This switches the vehicle communication device 41 between a state for transmitting UHF radio waves and a state for receiving UHF radio waves.

The electronic key 2 includes an operation unit 46 and a display unit 47, which displays various screens. For example, a touch panel is used as the display unit 47. Further, the electronic key 2 includes a communication unit 48 that may transmit and receive UHF radio waves. The communication unit 48 includes a single antenna 49, a transmission circuit 50, and a reception circuit 51. The transmission and reception circuits 50 and 51 both use the antenna 49. The key control unit 13 controls a switch unit 52 and selectively connects the transmission circuit 50 or the reception circuit 51 to the key control unit 13. This switches the communication unit 48 between a state for transmitting UHF radio waves and a state for receiving UHF radio waves. The electronic key 2 is one example of a terminal.

When an unlock operation is performed on the lid lock unit 27, if the vehicle exterior smart verification is not established, the lid unlock control section 36 determines, through bidirectional wide area communication (communication distance, approximately 10 meters) between the vehicle 1 and the electronic key 2, whether or not the unlocking operation of the lid lock unit 27 has been performed. The wide area communication of this example is bidirectional communication on the UHF band in a wider communication area than smart communication. Thus, for example, when the vehicle 1 is parked on the property of a house, and the user, who is carrying the electronic key 2, is inside the house and separated from the vehicle 1, radio waves from the vehicle 1 reach the electronic key 2.

In this example, if the lid unlock control section 36 determines that vehicle exterior smart communication verification has not been accomplished when the unlock operation is performed, the lid unlock control section 36 transmits a lid unlock check signal Sks from the transmission circuit 43 of the vehicle communication device 41 to the electronic key 2. The electronic key 2 receives the unlock check signal Sks with the reception circuit 51 and displays a lid unlock check screen 53 such as that illustrated in FIG. 9 on the display unit 47. When the user performs a lid unlock permission operation on the lid unlock check screen 53, the transmission circuit 50 of the electronic key 2 transmits a lid unlock permission signal Sok to the vehicle 1. When the reception circuit 44 receives the lid unlock permission signal Sok, the lid unlock control section 36 switches the lid lock unit 27 to the unlock state. In the second embodiment, the reception of the lid unlock permission signal Sok corresponds to a state in which a further lid unlock condition is satisfied.

The operation of the lid lock device 23 in the second embodiment will now be described with reference to the flowchart of FIG. 10. The contents of steps S100, S101, and S102 are the same as the first embodiment. Thus, only the steps that differ from the first embodiment will be described in detail.

In the second embodiment, when the lid unlock control section 36 may not recognize accomplishment of the vehicle exterior smart communication in step S101, the lid unlock control section 36 proceeds to step S201. In step S201, the lid unlock control section 36 checks whether or not a lid unlock permission operation has been performed through bi-directional communication with the electronic key 2. In this state, the lid unlock control section 36 connects the switch unit 45 to the transmission circuit 43 so that the vehicle communication device 41 functions as a transmitter and transmits the lid unlock check signal Sks on UHF radio waves to the electronic key 2, which is held by, for example, the user who is separated from the vehicle 1.

The key control unit 13 normally connects the switch unit 52 to the reception circuit 51 so that the communication unit 48 functions as a reception unit. When the key control unit 13 receives the lid unlock check signal Sks from the vehicle communication device 41 with the communication unit 48, the key control unit 13 shows the lid unlock check screen 53 of FIG. 9 on the display unit 47. Here, to permit the unlocking of the lid lock unit 27, the user touches a lid unlock permission button 54 on the lid unlock check screen 53. When the key control unit 13 detects that that the lid unlock permission button 54 of the lid unlock check screen 53 has been touched, the key control unit 13 connects the switch unit 52 to the transmission circuit 50 so that the communication unit 48 functions as a transmission unit. The key control unit 13 transmits the lid unlock permission signal Sok on UHF radio waves from the communication unit 48.

In step S202, after transmitting the lid unlock check signal Sks from the vehicle communication device 41, the lid unlock control section 36 connects the switch unit 45 to the reception circuit 44 so that the vehicle communication device 41 functions as a reception device for a predetermined time. During the predetermined time, the lid unlock control section 36 monitors whether or not a response to the lid unlock check signal Sks has been received from the electronic key 2, that is, whether or not user permission (lid unlock permission signal Sok) was received. When the lid unlock control section 36 receives the lid unlock permission signal Sok from the electronic key 2 during a predetermined time in which the vehicle communication device 41 functions as a receiver, the lid unlock control section 36 proceeds to step S102 and switches the lid lock unit 27 to the unlock state.

When the user permission may not be obtained in step S202, the lid unlock control section 36 returns to step S100 and waits again until a lid unlock operation is performed on the lid lock unit 27. In this manner, when the lid unlock permission signal Sok is not received from the electronic key 2 during the predetermined time in which the vehicle communication device 41 functions as a receiver, the lid unlock control section 36 has the user perform a lid unlock operation again.

In addition to advantages (2) to (5) of the first embodiment, the second embodiment has the following advantage.

(6) When the lid lock unit 27 is in the lock state and the user performs an unlock operation such as long-pushing of the lid 17, that is, demonstrates an intention to unlock the lid 17, the lid lock unit 27 is switched to the unlock state as long a vehicle exterior smart verification is accomplished. Further, even when vehicle exterior smart verification is not accomplished when an unlock operation is performed, when the user performs a lid unlock permission operation with the electronic key 2 through wide area communication between the vehicle 1 and the electronic key 2, the lid lock unit 27 is switched to the unlock state. Thus, even under a situation in which the electronic key 2 is not located in the vicinity of the vehicle 1, a person located in the vicinity of the vehicle may switch the lid lock unit 27 to the unlock state.

It should be apparent to those skilled in the art that the present invention may be embodied in many other specific forms without departing from the spirit or scope of the invention. Particularly, it should be understood that the present invention may be embodied in the following forms.

In each of the above embodiments, an antenna dedicated for a request transmission may be arranged in the vicinity of the lid 17, and smart verification may be performed with the dedicated antenna. Further, the dedicated antenna may be used together with the existing antennas (e.g., transmitters 9, 10, and the like). For example, the request signal Srq may be sequentially transmitted from these antennas to check whether or not verification of the electronic key 2 has been accomplished and determine whether or not the electronic key 2 is located in the vicinity of the lid 17.

In each of the above embodiments, when a lid unlock operation is detected with the lid switch 34, there is no need to perform smart verification (vehicle exterior smart verification) again. For example, the verification result of the smart verification performed when the user leaves the vehicle may be checked.

In each of the above embodiments, engagement of the hook 25 of the projection 24 with the lid lock pin 29 switches the lid lock unit 27 to the lock state. However, a different lock structure may be used. It is only necessary that the lock pin 29 engages with the lid 17 and that the lid lock unit 27 keeps the lid 17 closed. For example, the projection 24 of the lid 17 may include an insertion hole into which the lid lock pin 29 is inserted. Further, the coupling position and coupling direction of the lid lock unit 27 may be changed as required.

In each of the above embodiments, the lid lock unit 27 does not necessarily have to draw and move the lid lock pin 29, which is moved in the vertical direction by the urging member 30, to the unlock position with the attraction solenoid. For example, a rotational hook may be rotated by an actuator between a lock position and an unlock position.

In each of the above embodiments, the actuator 32 is not limited to an attraction solenoid and may be a different device such as a motor.

In each of the above embodiments, the lid switch 34 does not have to be arranged on the panel 18 (i.e., outer wall of the vehicle 1) to detect long-pushing of the lid 17. For example, a lid switch may be arranged in the vehicle 1 on an instrument panel or on the floor in vicinity of the driver seat. In this case, the lid switch is operated separately from the closing of the lid 17.

In each of the above embodiments, the lid switch 34 is not limited to a mechanical switch and may be, for example, a button illustrated on a touch panel display of a car navigation system.

In each of the above embodiments, the detection unit (lid switch 34) that detects a user's unlock operation of the lid lock unit 27 is not limited to a push switch and may be a different contact type switch, such as a microswitch. Further, the detection unit is not limited to a contact type switch and may be, for example, a non-contact switch, such as an optical sensor or a magnetic sensor.

In each of the above embodiments, the lid unlock operation is not limited to long-pushing of the lid 17 (i.e., lid switch 34). For example, when using a lever type switch as the lid switch 34, the pulling of the lever switch may be implemented as an unlock operation.

In each of the above embodiments, the lid switch 34 may be, for example, short-pushed. In this case, a guard timer that measures a predetermined time from smart verification accomplishment or any other switch operation may be used. In this structure, the operation of the lid switch 34 (lid unlock operation) is permitted only during the predetermined time measured by the guard timer.

In each of the above embodiments, various types of switches, sensors, and the like may be used as the door switch 12.

In each of the above embodiments, the authentication of the electronic key 2 is not limited to vehicle exterior smart verification and may be vehicle interior smart verification.

In each of the above embodiments, the authentication of the electronic key 2 is not limited to smart verification and may be, for example, a verification that uses a communication network differing from that of the smart verification. That is, the type of communication network is not limited as long as verification of the electronic key 2 held by the user located in the vehicle 1 or in the vicinity of the vehicle 1 may be performed through wireless communication between the electronic key 2 and the vehicle 1.

In each of the above embodiments, the electronic key 2 is not limited to a vehicle key and may be a different electronic terminal such as an IC card or a cellular phone (advanced function cellular phone, e.g., smartphone).

In each of the above embodiments, the electronic key 2 is not limited to a smart verification key and may be a key that is independent from the key-operation-free system 3.

In each of the above embodiments, the key-operation-free system 3 may be, for example, a system that determines whether the electronic key 2 is located inside or outside the vehicle 1 by arranging transmitters near the driver seat and passenger seat and combining responses from the electronic key 2 when receiving a request signal Srq transmitted from the transmitters.

In each of the above embodiments, the vehicle door of the key-operation-free system 3 does not have to be locked and unlocked by a user operation (e.g., touching of vehicle door knob). For example, the vehicle door may be automatically locked when the user approaches the vehicle 1 and automatically unlocked when the user leaves the vehicle 1.

In each of the above embodiments, the frequency of the radio waves is not limited to LF or UHF and may be a different frequency.

In the second embodiment, the wide area bidirectional communication is not limited to communication that uses UHF radio waves and may be, for example, communication that uses a cellular phone network or the Internet. Further, the terminal that communicates with the vehicle 1 is not limited to the electronic key 2 and may be a cellular phone (advanced function cellular phone, e.g., smartphone), a tablet terminal, or the like. Further, a message to the user asking whether or not to permit lid unlocking does not have to be shown on a display and may be, for example, an LED indication or a voice message using the electronic key 2.

In the first embodiment, when smart verification is not accomplished (electronic key 2 not present), the lid unlock control section 36 recognizes the unlock detection of the vehicle door as a situation in which a further lid unlock condition is satisfied. Further, in the second embodiment, when smart verification is not accomplished (electronic key 2 not present), the lid unlock control section 36 recognizes the reception of the lid unlock permission signal Sok from the electronic key 2 through wide area bidirectional communication as a situation in which a further lid unlock condition is satisfied. However, the further lid unlock condition is not limited to such situations. For example, the reception of lid unlock permission radio waves from a dedicated terminal (e.g., advanced function cellular phone, such as a smartphone, and other types of portable electronic terminals) may be a situation in which a further lid unlock condition is satisfied.

The concept of the first embodiment may be combined with the concept of the second embodiment.

The present examples and embodiments are to be considered as illustrative and not restrictive, and the invention is not to be limited to the details given herein, but may be modified within the scope and equivalence of the appended claims.

The invention claimed is:

1. A lid lock controller that controls locking and unlocking of a lid of a vehicle, wherein the lid is configured to open and close a fuel filler or a power inlet arranged in the vehicle, the lid lock controller comprising:
   a lid lock unit operable in a lock state, which keeps the lid closed, and an unlock state, which allows for the lid to open;
   a detection unit that detects an unlocking operation performed on the lid lock unit;
   a key check unit that checks whether an electronic key is located in a vicinity of the vehicle through wireless communication between the vehicle and the electronic key when the unlock operation is detected;
   an unlocking unit that switches the lid lock unit to the unlock state when the electronic key is located in the vicinity of the vehicle, wherein the unlocking unit switches the lid lock unit to the unlock state even when the electronic key is not located in the vicinity of the vehicle and a further lid unlock condition is satisfied; and
   a vehicle door lock-unlock detection unit that detects an unlock state of a user-operable vehicle door,
   wherein the unlocking unit switches the lid lock unit to the unlock state as long as the unlocking unit receives a detection signal, which indicates the unlock state of the vehicle door, from the vehicle door lock-unlock detection unit even if the electronic key is not located in the vicinity of the vehicle and not in electronic communication with the vehicle when the unlock operation performed on the lid lock unit is detected.

2. The lid lock controller according to claim 1, wherein the lid lock unit includes
   a lid lock pin engageable with the lid, and
   an urging member that urges the lid lock pin in a lock direction,
   when the lid is being closed, the lid pushes the lid lock pin in an unlock direction against an urging force of the urging member, and
   when the lid is fully closed and the lid lock pin is released from a force pushed by the lid, the lid lock pin is moved by the urging force of the urging member in the lock direction and engaged with the lid.

3. The lid lock controller according to claim 1, wherein the lid lock unit includes
   a lid lock pin engageable with the lid, and
   an actuator capable of drawing the lid lock pin in an unlock direction,
   the lid lock pin engages with the lid when the actuator is deactivated, and
   the lid lock pin is drawn in the unlock direction and separated from the lid when the actuator is activated.

4. The lid lock controller according to claim 1, wherein the key check unit checks whether or not the electronic key is located in the vicinity of the vehicle by determining whether or not verification of the electronic key has been accomplished through near field communication performed between the electronic key and the vehicle.

5. The lid lock controller according to claim 1, wherein the unlock operation performed on the lid lock unit is an operation that long-pushes the lid, which is closed, further inward to an over stroke position.

6. A lid lock controller that controls locking and unlocking of a lid of a vehicle, wherein the lid is configured to open and close a fuel filler or a power inlet arranged in the vehicle, the lid lock controller comprising:
   a lid lock unit operable in a lock state, which keeps the lid closed, and an unlock state, which allows for the lid to open;
   a detection unit that detects an unlocking operation performed on the lid lock unit;
   a key check unit that checks whether an electronic key is located in a vicinity of the vehicle through wireless communication between the vehicle and the electronic key when the unlock operation is detected; and
   an unlocking unit that switches the lid lock unit to the unlock state when the electronic key is located in the vicinity of the vehicle, wherein the unlocking unit switches the lid lock unit to the unlock state even when the electronic key is not located in the vicinity of the vehicle and a further lid unlock condition is satisfied,
   wherein the unlocking unit switches the lid lock unit to the unlock state as long as the unlocking unit receives a lid unlock permission signal from an electronic terminal, located at a position separated from the vehicle, through wide area communication even if the electronic key is not located in the vicinity of the vehicle and not in electronic communication with the vehicle when the unlock operation performed on the lid lock unit is detected.

7. The lid lock controller according to claim 6, wherein the lid lock unit includes
   a lid lock pin engageable with the lid, and
   an urging member that urges the lid lock pin in a lock direction,
   when the lid is being closed, the lid pushes the lid lock pin in an unlock direction against an urging force of the urging member, and
   when the lid is fully closed and the lid lock pin is released from a force pushed by the lid, the lid lock pin is moved by the urging force of the urging member in the lock direction and engaged with the lid.

8. The lid lock controller according to claim 6, wherein the lid lock unit includes
- a lid lock pin engageable with the lid, and
- an actuator capable of drawing the lid lock pin in an unlock direction, the lid lock pin engages with the lid when the actuator is deactivated, and the lid lock pin is drawn in the unlock direction and separated from the lid when the actuator is activated.

9. The lid lock controller according to claim 6, wherein the key check unit checks whether or not the electronic key is located in the vicinity of the vehicle by determining whether or not verification of the electronic key has been accomplished through near field communication performed between the electronic key and the vehicle.

10. The lid lock controller according to claim 6, wherein the unlock operation performed on the lid lock unit is an operation that long-pushes the lid, which is closed, further inward to an over stroke position.

* * * * *